(12) United States Patent
Maeda

(10) Patent No.: US 6,999,145 B2
(45) Date of Patent: Feb. 14, 2006

(54) LIQUID CRYSTAL DISPLAY DEVICE SATISFYING RELATIONSHIP BETWEEN CHARACTERISTICS OF LIQUID CRYSTAL PANEL AND DIFFUSING LAYER

(75) Inventor: Tsuyoshi Maeda, Ryuo-cho (JP)

(73) Assignee: Seiko Epson Corporation, Tokyo (JP)

( * ) Notice: Subject to any disclaimer, the term of this patent is extended or adjusted under 35 U.S.C. 154(b) by 71 days.

(21) Appl. No.: 10/823,714

(22) Filed: Apr. 14, 2004

(65) Prior Publication Data

US 2004/0246416 A1 Dec. 9, 2004

(30) Foreign Application Priority Data

May 1, 2003 (JP) .............................. 2003-126580

(51) Int. Cl.
*G02F 1/1335* (2006.01)
(52) U.S. Cl. ...................................... 349/114; 349/112
(58) Field of Classification Search ................ 349/112, 349/114
See application file for complete search history.

(56) References Cited

U.S. PATENT DOCUMENTS

| | | | |
|---|---|---|---|
| 5,796,455 A * | 8/1998 | Mizobata et al. ........... | 349/112 |
| 6,348,960 B1 * | 2/2002 | Etori et al. ................. | 349/112 |
| 6,771,334 B2 * | 8/2004 | Kubota et al. .............. | 349/106 |
| 6,801,276 B1 * | 10/2004 | Epstein et al. .............. | 349/112 |

FOREIGN PATENT DOCUMENTS

| | | |
|---|---|---|
| JP | A 9-113893 | 5/1997 |
| JP | A 11-237623 | 8/1999 |
| JP | A 11-242226 | 9/1999 |

* cited by examiner

*Primary Examiner*—Tarifur R. Chowdhury
(74) *Attorney, Agent, or Firm*—Oliff & Berridge, PLC

(57) ABSTRACT

The invention provides a high-image-quality, wide-viewing-angle liquid crystal display device that can be manufactured at low cost, and to provide an electronic apparatus provided with such a liquid crystal display device. A liquid crystal display device of the invention can include an upper substrate and a lower substrate which are disposed facing each other, a liquid crystal layer interposed between the upper substrate and the lower substrate, an upper polarizer and a lower polarizer which are separated by the liquid crystal layer and are disposed adjacent to two opposite sides of the liquid crystal layer, and a liquid crystal panel having dot regions each provided with a transmissive display area and a reflective display area. One of the upper substrate and the lower substrate can be provided with a liquid-crystal-layer thickness adjustment layer on a side of the substrate adjacent to the liquid crystal layer. This liquid-crystal-layer thickness adjustment layer provides different thicknesses for the liquid crystal layer in the transmissive display area and the reflective display area. The upper substrate has a light-diffusing layer disposed adjacent to the outer surface of the upper substrate. A half-width α for the contrast-versus-viewing-angle characteristics of the liquid crystal panel and a half-width β for the diffusion characteristics of the light-diffusing layer satisfy the relationship $\alpha \geq 3\beta$.

9 Claims, 11 Drawing Sheets

LIQUID CRYSTAL DISPLAY DEVICE SATISFYING RELATIONSHIP BETWEEN CHARACTERISTICS OF LIQUID CRYSTAL PANEL AND DIFFUSING LAYER

BACKGROUND OF THE INVENTION

1. Field of Invention

The present invention relates to liquid crystal display devices and electronic apparatuses.

2. Description of Related Art

Transflective liquid crystal display devices, which are provided with dot regions each having a reflective display area and a transmissive display area, have both reflective and transmissive functions and are thus capable of switching between display modes depending on the ambient brightness. Such transflective liquid crystal display devices are suitable for displays in portable apparatuses since these devices have low power consumption and are capable of providing a high-quality display even in dark surroundings. Particularly in recent years, portable apparatuses are becoming more and more common and are continuously being developed to have high performance, and for this reason, further demands for high image quality as well as cost reduction for transflective liquid crystal display devices are becoming stronger.

Known technology for improving the contrast of a display in a transflective liquid crystal display device is the use of a "multi-gap structure" in which the liquid crystal layer is given different thicknesses in the reflective display areas and transmissive display areas. See, for example, Japanese Unexamined Patent Application Publication No. 11-242226.

Furthermore, known technology for reducing costs for transflective liquid crystal display devices is providing a forward-scattering film having light diffusing functions on an outer surface of one of the substrates of a liquid crystal panel. See, for example, Japanese Unexamined Patent Application Publication No. 9-113893 and Japanese Unexamined Patent Application Publication No. 11-237623. By providing such forward-scattering films, resin films having irregularities for providing light-diffusing functions to reflective layers are not necessary, thus reducing the number of manufacturing steps to contribute to lower manufacturing costs as well as higher yield rates. Furthermore, this structure advantageously prevents color-shifting of display-light due to optical interference caused by the pitch of the irregularities.

SUMMARY OF THE INVENTION

In view of high image quality or cost reduction of liquid crystal display devices, the technologies described above are effective, and moreover, by combining them, a high-image-quality liquid crystal display device may be provided at lower cost. However, it was found that such combinations deteriorate the contrast-versus-viewing-angle characteristics particularly for transmissive display.

In view of these circumstances, it is an object of the invention to provide a high-image-quality, wide-viewing-angle liquid crystal display device that can be manufactured at low cost, and to provide an electronic apparatus provided with such a liquid crystal display device.

Transflective liquid crystal display devices combined with forward-scattering films have problems of narrow viewing angles, which may be caused particularly as in the following. Firstly, transflective liquid crystal display devices have had a problem of narrow viewing angles for transmissive display. This is due to the fact that a transflective film is provided on the inner surface of the liquid crystal panel for preventing parallax errors, thus restricting the operation of the reflective display to the use of only a single polarizer provided adjacent to the viewer. This inevitably reduces the flexibility for optical layout.

Secondly, in a transflective liquid crystal display device having a forward-scattering film, although visual improvement by light diffusion is achieved for reflective display, light beams for transmissive display are also similarly diffused. This causes some of the light beams incident on the liquid crystal panel at an angle to escape out toward the direction of the viewer (forward direction of the liquid crystal panel). Consequently, the black level of the liquid crystal display device is increased, thus lowering the contrast. For this reason, in addition to the narrow viewing angle, an application of a forward-scattering film to a transflective liquid crystal display device also deteriorates the contrast-versus-viewing-angle characteristics and lowers the display quality significantly.

Based on these speculations, the invention can include a structure that achieves a high-contrast, wide-viewing-angle display in a transflective liquid crystal display device having a light-diffusing layer adjacent to the front face of the liquid crystal panel.

A liquid crystal display device of the invention can include an upper substrate and a lower substrate which are disposed facing each other, a liquid crystal layer interposed between the upper substrate and the lower substrate, an upper polarizer and a lower polarizer which are separated by the liquid crystal layer and are disposed adjacent to two opposite sides of the liquid crystal layer, and a liquid crystal panel having dot regions each provided with a transmissive display area and a reflective display area. One of the upper substrate and the lower substrate is provided with a liquid-crystal-layer thickness adjustment layer on a side of the substrate adjacent to the liquid crystal layer. This liquid-crystal-layer thickness adjustment layer provides different thicknesses for the liquid crystal layer in the transmissive display area and the reflective display area. The upper substrate has a light-diffusing layer disposed adjacent to the outer surface of the upper substrate. A half-width $\alpha$ for the contrast-versus-viewing-angle characteristics of the liquid crystal panel and a half-width $\beta$ for the diffusion characteristics of the light-diffusing layer satisfy the relationship $\alpha \geq 3\beta$.

Accordingly, the diffusion characteristics of the light-diffusing layer and the contrast-versus-viewing-angle characteristics of the liquid crystal panel may be controlled within an appropriate range, thus providing a liquid crystal display device achieving high contrast, wide-viewing-angle display. The present inventor has verified whether the condition, namely, satisfaction of the relationship $\alpha \geq 3\beta$ between the half-width a for the viewing-angle characteristics of the liquid crystal panel and the half-width $\beta$ for the diffusion characteristics of the light-diffusing layer, is suitable, and this verification will be described later in greater detail below with evaluation results.

In the liquid crystal display device of the present invention, the haze value of the light-diffusing layer is preferably set to at least 20%. The term haze value refers to a % value derived by dividing diffuse transmittance by total light transmittance. By setting the haze value of the light-diffusing layer to at least 20%, a bright reflective display without specularities can be achieved. The present inventor has verified that this range for the haze value is suitable by using an actual liquid crystal display device, and this verification will be described later in greater detail below.

In the liquid crystal display device of the invention, the viewing-angle characteristics of the liquid crystal panel may be set such that the contrast is at maximum substantially in the direction of the normal line of the panel. Accordingly, the viewing angle with the highest image quality may be aligned with the viewing-angle direction of the viewer, thus substantially enhancing the quality of the display.

In the liquid crystal display device of the invention, the viewing-angle direction at the maximum contrast of the liquid crystal panel and the direction at the maximum intensity of light emission of the light-diffusing layer may be substantially aligned with each other, the light being incident on the light-diffusing layer from the normal-line direction of the light-diffusing layer. Accordingly, transmissive display contrast deterioration caused by the light-diffusing layer may be restrained, and moreover, lowering of the display quality for transmissive display caused by providing the light-diffusing layer may also be restrained. Furthermore, since the liquid crystal display device may have a maximum display luminance in the direction in which the contrast is at maximum, a bright high-contrast transmissive display may be achieved.

In the liquid crystal display device of the invention, the viewing-angle characteristics of the liquid crystal panel may be substantially symmetrical with respect to the forward direction of the liquid crystal panel. Accordingly, this structure may prevent low contrast in certain directions even if the display-light is diffused by the light-diffusing layer, thus achieving a high-contrast display.

In the liquid crystal display device of the invention, the liquid crystal layer may include liquid crystal having negative dielectric anisotropy. In other words, this allows the use of a liquid crystal display device having liquid crystal with homeotropic alignment in an initial state. Accordingly, a wide-viewing-angle, high-contrast transmissive display may be achieved as well as achieving a good reflective display by the light-diffusing layer, thus providing a high-image-quality, transflective liquid crystal display device at low cost.

The liquid crystal display device of the invention may further include electrode layers which are separated by the liquid crystal layer and are provided on two opposite sides of the liquid crystal layer. Each of the electrode layers is provided with alignment-regulating means for regulating the alignment of the liquid crystal.

In a liquid crystal display device having liquid crystal with homeotropic alignment in an initial state, if the liquid crystal molecules are tilted in a disorderly manner in response to a voltage change, disclination lines may be unevenly produced at boundaries of regions (domains) in which liquid crystal molecules are aligned in the same direction. In that case, spot-like graininess may be visible when the liquid crystal panel is viewed from an angle. According to the present invention, the alignment-regulating means provided on the electrode layers may fix the disclination lines within each dot region to prevent such spot-like graininess, thus achieving a high-image-quality display.

The liquid crystal display device of the invention may further include a circularly-polarized-light entering device for allowing circularly-polarized light to enter the upper substrate and the lower substrate. The use of circularly-polarized light omits the necessity for regulating the direction in which the liquid crystal molecules are tilted during voltage application, and as long as the liquid crystal molecules are tilted, a brighter display may be achieved.

Furthermore, an electronic apparatus of the invention can include the liquid crystal display device according to the invention described above. Accordingly, an electronic apparatus having a high-image-quality, wide-viewing-angle display region may be provided.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

An embodiment of the invention will now be described with reference to the drawings.

Figure 1:
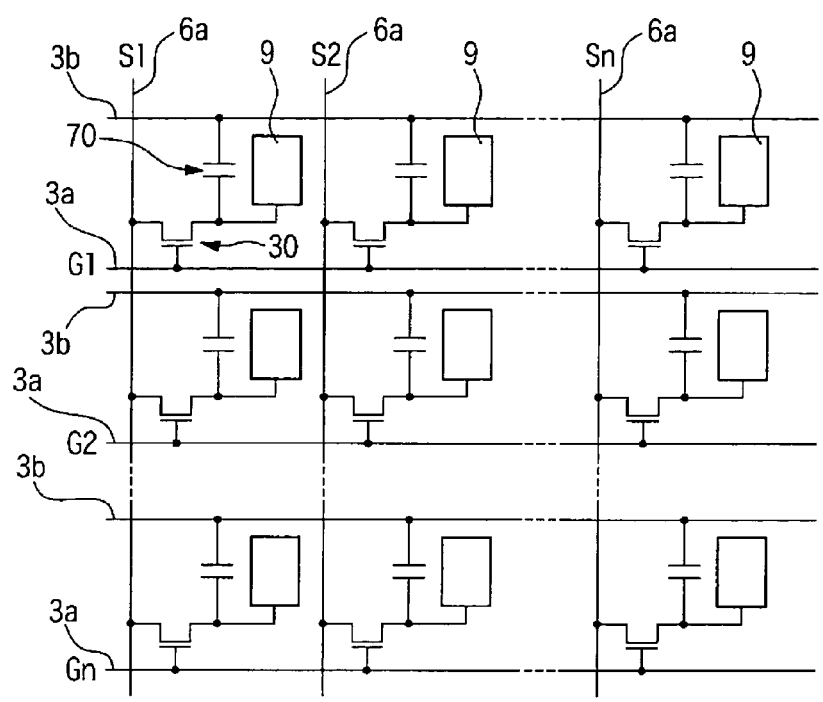
FIG. 1 is a circuit diagram of a liquid crystal display device according to an embodiment.
Figure 2:
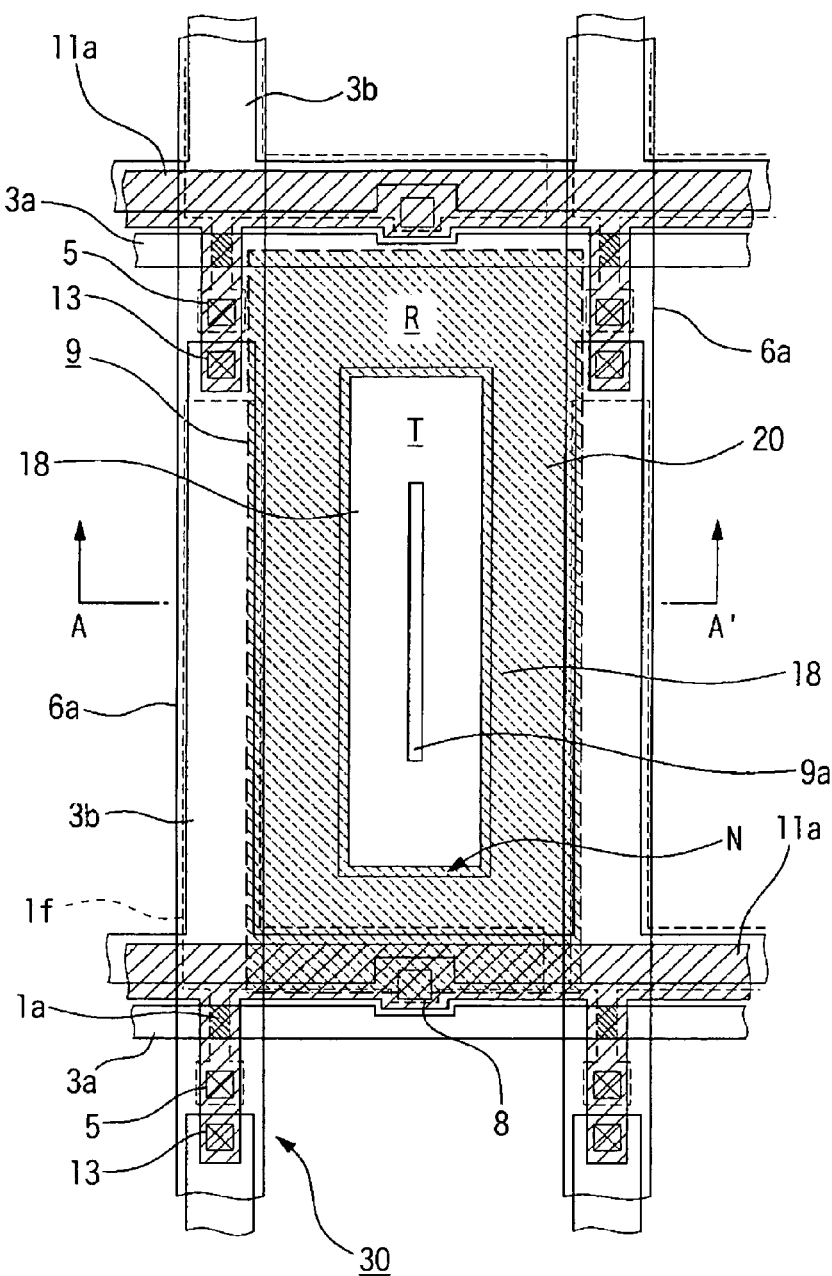
FIG. 2 is a plan view of the liquid crystal display device according to the embodiment.
Figure 3:
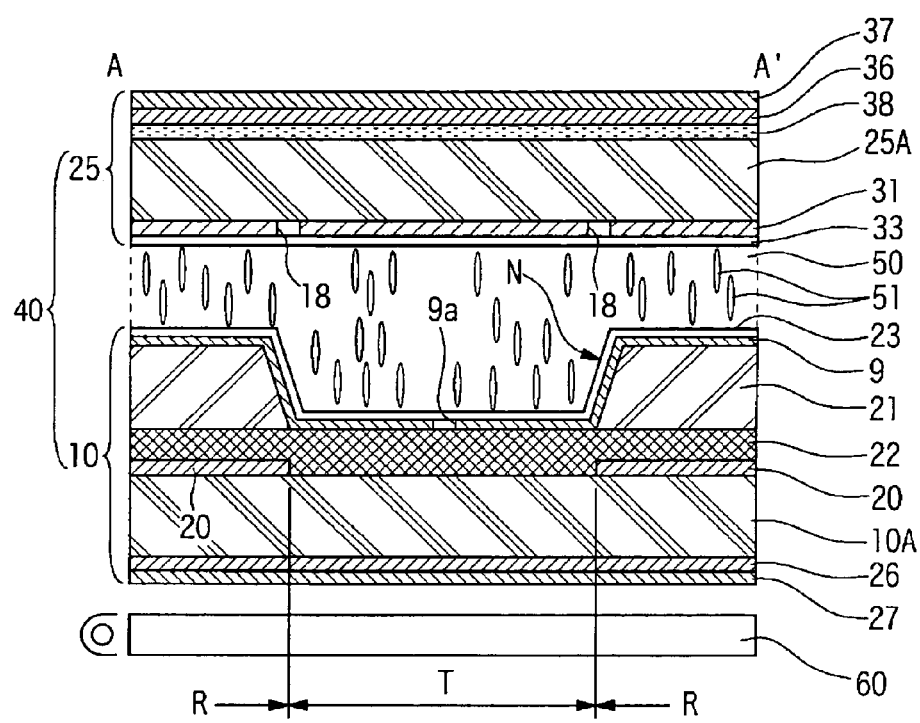
FIG. 3 is a cross-sectional view of the liquid crystal display device according to the embodiment.

A liquid crystal display device of this embodiment is an example of an active-matrix liquid crystal display device employing thin film transistors (TFTs) as switching elements. FIG. 1 is an equivalent circuit diagram having a plurality of dots arranged in a matrix forming an image display region of the liquid crystal display device according to this embodiment. FIG. 2 is a plan view illustrating the structure of one of the dots on a TFT-array substrate. FIG. 3 is a partial cross-sectional view taken along line A—A' of FIG. 2. In each of the drawings, each layer and component is shown at a different scale to improve viewability.

Referring to FIG. 1, in the liquid crystal display device of this embodiment, the plurality of dots arranged in a matrix forming the image display region are each provided with a pixel electrode 9 and a TFT 30 which acts as a switching element for controlling the pixel electrode 9. Each of data lines 6a, to which image signals are supplied, is electrically connected to sources of the corresponding TFTs 30. Image signals S1, S2, ..., Sn, which are written onto the data lines 6a, are supplied in that order to the data lines 6a. Alternatively, the signals may be supplied to each group of data lines 6a disposed adjacent to one another. Each of a plurality of scanning lines 3a is electrically connected to gates of the corresponding TFTs 30. Scanning signals G1, G2, ..., Gm are sequentially applied to the scanning lines 3a in pulses at a predetermined timing in that order. Each pixel electrode 9 is electrically connected to a drain of the corresponding TFT 30. By switching on the TFT 30, which acts as a switching element, for a certain period of time, one of the image signals S1, S2, ..., Sn supplied from the corresponding data line 6a is written onto the pixel electrode 9 at a predetermined timing.

The image signals S1, S2, ..., Sn that are written on the liquid crystal at a predetermined level via the pixel electrodes 9 are held between the pixel electrodes 9 and a common electrode, which will be described later, for a certain period of time. The molecular alignment and order of the liquid crystal change according to the applied voltage level so as to modulate light, thus achieving gradation display. To prevent the held image signals from leaking, storage capacitors 70 are provided in parallel with liquid crystal capacitances formed between the pixel electrodes 9 and the common electrode. Each reference character 3b indicates a capacitor line.

Referring to FIG. 2, the planar structure of the TFT-array substrate (the lower substrate according to the present invention) of the liquid crystal display device according to this embodiment will now be described.

As is shown in FIG. 2, one of the pixel electrodes 9 is provided on the TFT-array substrate. The data lines 6a, the scanning lines 3a, and the capacitor lines 3b are disposed along the vertical and horizontal edges of the pixel electrodes 9. In this embodiment, each pixel electrode 9 and its surrounding region including, for example, the data lines 6a, one of the scanning lines 3a, and one of the capacitor lines 3b form one dot region. Each of the dot regions arranged in a matrix functions as a part of the display.

Each data line 6a is electrically connected to source areas of semiconductor layers 1f formed of, for example, a polysilicon film in the TFTs 30 via contact holes 5. Each pixel electrode 9 is electrically connected to a drain area, which will be described later, of the corresponding semiconductor layer 1f via a contact hole 8. A slit opening 9a having substantially a linear structure extends longitudinally (longitudinal direction of the drawing) through substantially the central region of each pixel electrode 9. Furthermore, channel areas 1a of the TFTs 30 are formed in the sections where the semiconductor layers 1f and the scanning lines 3a intersect in plan view (sections indicated by negative slopes in the drawing). The sections of each scanning line 3a facing the channel areas 1a function as gate electrodes.

Each capacitor line 3b includes a main segment extending substantially straight along the scanning line 3a (in other words, a first segment formed along the scanning line 3a in plan view), and projecting segments which extend toward the upper level (upward in the drawing) along the data lines 6a from where the capacitor line 3b and the data lines 6a intersect (in other words, second segments extending along the data lines 6a). In FIG. 2, a plurality of first light-blocking films 11a are provided in areas indicated by positive slopes.

In detail, each of the first light-blocking films 11a covers the TFTs 30 including the channel areas 1a of the semiconductor layers 1f as seen from the side adjacent to the TFT-array substrate. Furthermore, each first light-blocking film 11a includes a main segment extending straight along the scanning line 3a and facing the main segment of the capacitor line 3b, and projecting segments which extend toward the lower level (downward in the drawing) along the data lines 6a from where the first light-blocking film 11a and the data lines 6a intersect. Under the data lines 6a, the tips of the downward projecting segments of the first light-blocking film 11a in each level (pixel row) overlap with the tips of the upward projecting segments of the capacitor line 3b in the subsequent level. In these overlapping sections, contact holes 13 are provided for electrically connecting the first light-blocking films 11a with the capacitor lines 3b. In other words, in this embodiment, each first light-blocking film 11a is electrically connected with each capacitor line 3b of the upper level or the lower level via the contact holes 13.

Referring to FIG. 2, the peripheral section of each dot region is provided with a reflective film 20 having a rectangular frame-like structure. This area with the reflective film 20 acts as a reflective display area R, and the inner area without the reflective film 20 acts as a transmissive display area T. In plan view, the area with the reflective film 20 within the dot region is provided with an insulation film (liquid-crystal-layer thickness adjustment film). In FIG. 2, the boundary between the reflective display area R and the transmissive display area T is indicated by reference character N, which is an inclined boundary forming a slope in a cross-sectional view. The cross-sectional structure of the boundary N will be described below in detail with reference to FIG. 3.

The cross-sectional structure of the liquid crystal display device of this embodiment will now be described with reference to FIG. 3. FIG. 3 is a partial cross-sectional view taken along line A—A' of FIG. 2.

Referring to FIG. 3, the liquid crystal display device of this embodiment can include a liquid crystal panel 40 having a liquid crystal layer 50 disposed between a TFT-array substrate (lower substrate) 10 and an opposing substrate (upper substrate) 25 which face each other. The liquid crystal layer 50 is formed of negative dielectric anisotropy liquid crystal with homeotropic alignment in an initial state. Furthermore, adjacent to the rear surface of the liquid crystal panel 40 (lower side of the drawing) is provided a backlight (illuminator) 60. Reference numeral 51 indicates schematically each of the liquid crystal molecules included in the liquid crystal layer 50.

The TFT-array substrate 10 includes a main substrate body 10A formed of a transparent material, such as quartz and glass. The reflective film 20 formed of a highly reflective metal, such as aluminum and silver, is partially disposed on the surface of the main substrate body 10A. As described previously, the area with the reflective film 20 functions as the reflective display area R, and the area without the reflective film 20 functions as the transmissive display area T. Over the reflective film 20 in the reflective display area R and the main substrate body 10A in the transmissive display area T, a color-material layer 22 which forms a color filter is disposed. Adjacent dot regions are provided with color-material layers 22 of different colors, i.e., red (R), green (G), and blue (B), and three adjacent dot regions form one pixel. Alternatively, the reflective display area R and the transmissive display area T may be provided with separate color-material layers having different color purities to compensate for the different chroma of the display color between reflective and transmissive display.

Over the region of the color-material layer 22, i.e., the color filter, substantially corresponding to the reflective display area R, an insulation film 21 is disposed. The insulation film 21 is formed of an organic film of, for example, acrylic resin having a thickness of, for example, about 2 μm±1 μm. The insulation film 21 has an inclined boundary N between the reflective display area R and the transmissive display area T where the thickness of the film 21 changes continuously to form a slope. The thickness of the liquid crystal layer 50 in the area without the insulation film 21 is about 2 to 6 μm, and therefore, the thickness of the liquid crystal layer 50 in the reflective display area R is about half the thickness of the layer 50 in the transmissive display area T. Accordingly, the insulation film 21 gives different thicknesses to the liquid crystal layer 50 in the reflective display area R and the transmissive display area T, and functions as an adjustment layer for the thickness of the liquid crystal layer 50, thus achieving a multi-gap structure.

In this embodiment, the lower edges of the insulation film 21 are substantially aligned with the edges of the reflective film 20 (the reflective display area R) in plan view, and the inclined boundary N is substantially included in the reflective display area R. Consequently, the inclined boundary N, which gives uneven thickness to the liquid crystal layer 50 to cause disordered liquid crystal alignment, is outside the transmissive display area T so as to achieve satisfactory transmissive display.

The pixel electrode 9, which is substantially rectangular in plan view and is composed of a transparent conductive film of, for example, ITO (indium tin oxide), is disposed over the TFT-array substrate 10 including the surface of the insulation film 21. On the pixel electrode 9, an alignment film 23 composed of, for example, polyimide is disposed. The slit opening 9a extending vertically through the central region of the transmissive display area T in FIG. 2 is formed in the pixel electrode 9 of the TFT-array substrate 10, as shown in FIG. 3.

On the other hand, the opposing substrate 25 includes a main substrate body 25A formed of a transparent material such as quartz and glass. On the main substrate body 25A, a common electrode 31 formed of a transparent conductive film of, for example, ITO and an alignment film 33 formed of, for example, polyimide are disposed in that order. The alignment films 23 and 33 of the TFT-array substrate 10 and the opposing substrate 25, respectively, are both given homeotropic-alignment treatments but are not given pre-tilting treatments, such as rubbing.

As shown in FIG. 3, the common electrode 31 is partially opened in each dot region. As shown in FIG. 2 in plan view, these openings 18 are disposed in positions that substantially align with a side of the boundary N extending in the vertical direction of the drawing. In the liquid crystal display device of this embodiment, the openings 18 and the slit opening 9a mentioned above function as alignment regulating means for regulating the tilting directions of the homeotropic-alignment liquid crystal of the liquid crystal layer 50 during a voltage change.

Figure 4A:
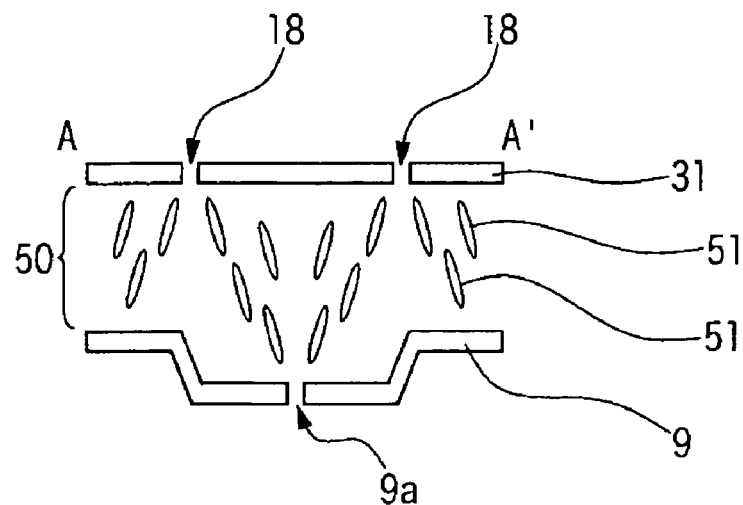
FIG. 4(a) is a schematic cross-sectional diagram describing the operation of openings and a slit opening which act as alignment regulating means according to the embodiment.

FIG. 4(a) is a schematic cross-sectional diagram describing the alignment regulating operation by the slit opening 9a and the openings 18. As shown in FIG. 4(a), according to the liquid crystal display device of this embodiment, during a voltage change, the liquid crystal molecules 51 are tilted in the two opposite width-wise directions of the openings 18 and the slit opening 9a which extend substantially perpendicular to the drawing. This fixes the domain boundaries of the liquid crystal molecules 51 to effectively prevent spot-like graininess when viewed from an angle, which is a problem affecting display quality in liquid crystal display devices having a homeotropic-alignment liquid crystal layer. Accordingly, a wide-viewing-angle display is satisfactorily achieved.

Figure 4B:
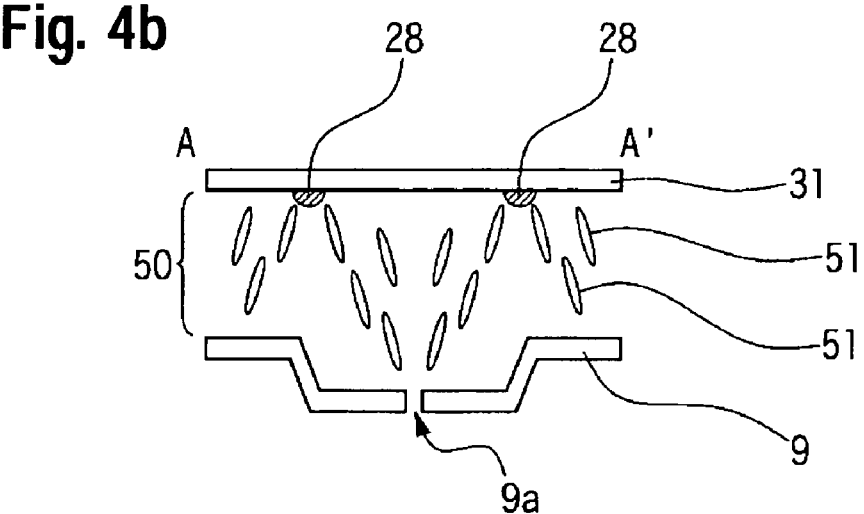
FIG. 4(b) is another schematic cross-sectional diagram showing an example in which protrusions are alternatively provided as the alignment regulating means.

Referring to FIG. 4(b), the alignment regulating means may alternatively be protrusions 28 which extend substantially perpendicular to the drawing. Such protrusions 28 may effectively control the tilting directions of the liquid crystal molecules 51, thus achieving a high-quality display with a wide viewing angle.

Furthermore, in this embodiment, the alignment of the openings 18 with the inclined boundary N in plan view allows defective display areas, which are caused by the uneven thickness of the liquid crystal layer 50 along the boundary N, to overlap with the domain boundaries of the liquid crystal molecules 51 along the regions corresponding to the openings 18 in plan view. Accordingly, a higher aperture ratio for the liquid crystal display device is provided, thus achieving a brighter display.

Furthermore, a waveplate 26 and a polarizer 27 are disposed over the main substrate body 10A in that order on the side adjacent to the outer surface of the TFT-array substrate 10. A light-diffusing layer 38, a waveplate (upper waveplate) 36, and a polarizer 37 are disposed over the main substrate body 25A in that order on the side adjacent to the outer surface of the opposing substrate 25.

The waveplates 26 and 36 have substantially λ/4-wavelength retardation for visible-light wavelengths. The combination of these waveplates and polarizers allows circularly-polarized light to enter the liquid crystal layer 50 from both sides, i.e., the TFT-array substrate 10 and the opposing substrate 25, and then linearly-polarized light is released. Furthermore, a backlight 60 which includes, for example, a light source, a reflector, and a light-guiding plate is provided on the exterior of the liquid crystal cell adjacent to the outer surface of the TFT-array substrate 10.

In view of the basic structure of the light-diffusing layer 38 provided in the liquid crystal display device according to this embodiment, forward-scattering films, such as those disclosed in Japanese Unexamined Patent Application Publication No. 2000-035506, Japanese Unexamined Patent Application Publication No. 2000-066026, and Japanese Unexamined Patent Application Publication No. 2000-180607 may be used. For example, Japanese Unexamined Patent Application Publication No. 2000-035506 discloses a forward-scattering film formed of a resin sheet. This resin sheet is composed of a mixture of at least two types of photopolymerizable monomers or oligomers, each type having a different refractive index from the other. This resin sheet is provided with a light-scattering function in which ultraviolet light is emitted towards the sheet at an angle and is effectively scattered from the sheet at certain wide angles, and a diffracting function which effectively diffracts light at certain angles. Alternatively, a forward-scattering film formed of an on-line holographic diffusion sheet disclosed in Japanese Unexamined Patent Application Publication No. 2000-066026 may be used. This diffusion sheet is formed in a layered structure in which regions with different refractive indices are formed by irradiating laser beams onto a photosensitive material used for producing holograms.

In the liquid crystal display device of this embodiment, the haze value of the light-diffusing layer 38 is preferably set at 20% or higher. The reason for this is because a higher haze value improves the light diffusibility in the reflective display area R to achieve brighter reflective display without specularities. Below, Table 1 shows the results of an evaluation of the luminance of the reflective display (reflectance (%)) and the presence of specularities based on visual observation of six types of liquid crystal panels 40 having light-diffusing layers 38 with various haze values.

As shown in Table 1, it is evident that by setting the haze value of the light-diffusing layer 38 at 20% or higher, a brighter reflective display without specularities can be achieved.

TABLE 1

| Haze value (%) | 5 | 10 | 20 | 50 | 80 | 90 |
|---|---|---|---|---|---|---|
| Reflectance (%) | 5 | 8 | 18 | 25 | 30 | 28 |
| Specularity | present | present | absent | absent | absent | absent |

As mentioned above, a higher haze value for the light-diffusing layer 38 provides a brighter reflective display and achieves a high-quality display without specularities. However, at the same time, the black level (black luminance) for transmissive display increases, and thus tends to lower the contrast for transmissive display. According to the liquid crystal display device of this embodiment, a combination of the diffusion characteristics of the light-diffusing layer 38 and the viewing-angle characteristics of the liquid crystal panel 40 are optimized together to effectively prevent deterioration of the viewing-angle characteristics as caused generally when a light-diffusing layer is provided adjacent to the front face of a transflective liquid crystal panel. Accordingly, high-image-quality transmissive display is achieved.

Figure 5:
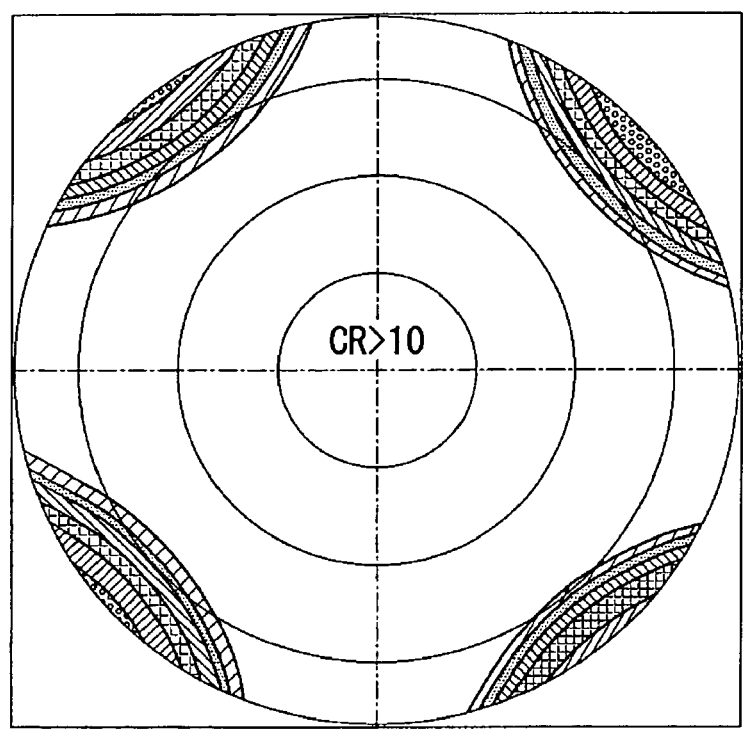
FIG. 5 illustrates contrast curves, in contour, for describing a liquid crystal panel 40 according to the embodiment.
Figure 6:
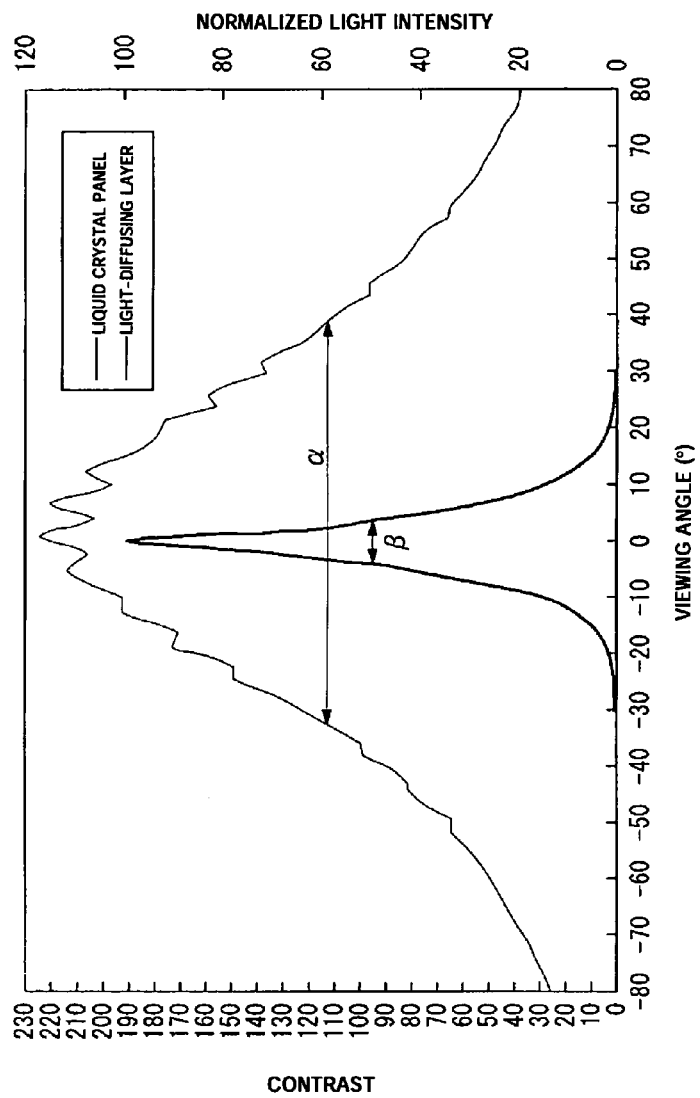
FIG. 6 is a graph showing contrast-versus-viewing-angle characteristics of the liquid crystal panel 40 (liquid crystal panel A) and diffusion characteristics of a light-diffusing layer 38.

FIG. 5 is a graph illustrating contrast curves, in contour, to describe the viewing-angle characteristics of the liquid crystal panel 40 (liquid crystal panel A). FIG. 6 is a graph in which the left axis indicates the viewing-angle characteristics of the liquid crystal panel 40 and the right axis indicates the diffusion characteristics of the light-diffusing layer 38. A region indicated by "CR>10" in FIG. 5 represents a viewing-angle range in which the contrast value is 10 or more. The contrast distribution of the liquid crystal panel 40 shown in FIG. 6 corresponds to the contrast distribution along the horizontal axis of FIG. 5. Furthermore, referring to FIG. 6, a forward-scattering film having a haze value of 80% is used as the light-diffusing layer 38, and the diffusion characteristics of the film are normalized such that the maximum intensity value of emitted light is 100.

Figure 11:
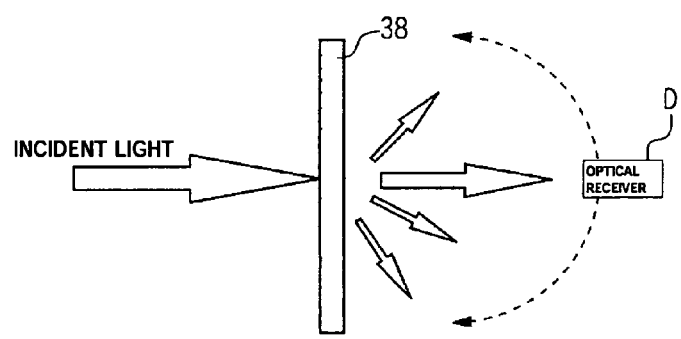
FIG. 11 is a schematic diagram describing the method for measuring the diffusion characteristics of the light-diffusing layer 38.

The viewing-angle characteristics of the liquid crystal panel 40 were measured in a state where the light-diffusing layer 38 was not provided. On the other hand, as shown in FIG. 11, the diffusion characteristics of the light-diffusing layer 38 were measured using a movable optical receiver D. In detail, a light beam emitted from a light source K disposed adjacent to the rear face of the light-diffusing layer 38 (left half of the drawing) is received by the light-diffusing layer 38 and is transmitted through the light-diffusing layer 38. The optical receiver D moves along the dashed line shown in the drawing based on the normal line of the light-diffusing layer 38 to measure the intensity of the transmitted light.

As shown in FIG. 6, the half width α for the contrast-versus-viewing-angle characteristics of the liquid crystal panel 40 according to this embodiment is approximately 70°, and the half-width β for the diffusion characteristics of the light-diffusing layer 38 is approximately 10°. Accordingly, in the liquid crystal display device of this embodiment, the relationship $\alpha \geq 3\beta$, is sufficiently achieved to satisfy the required conditions of the invention.

Figure 7:
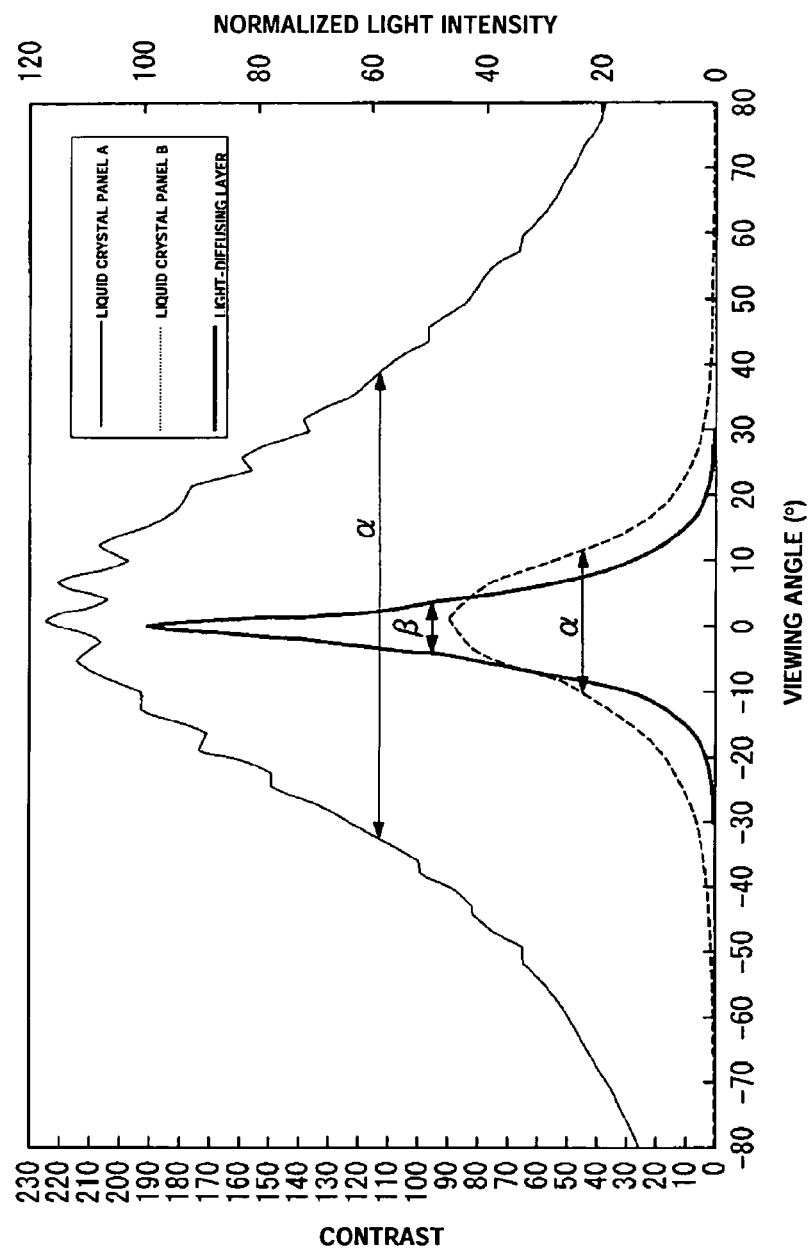
FIG. 7 is a graph showing contrast-versus-viewing-angle characteristics of the liquid crystal panel A and a liquid crystal panel B and diffusion characteristics of the light-diffusing layer 38.
Figure 8:
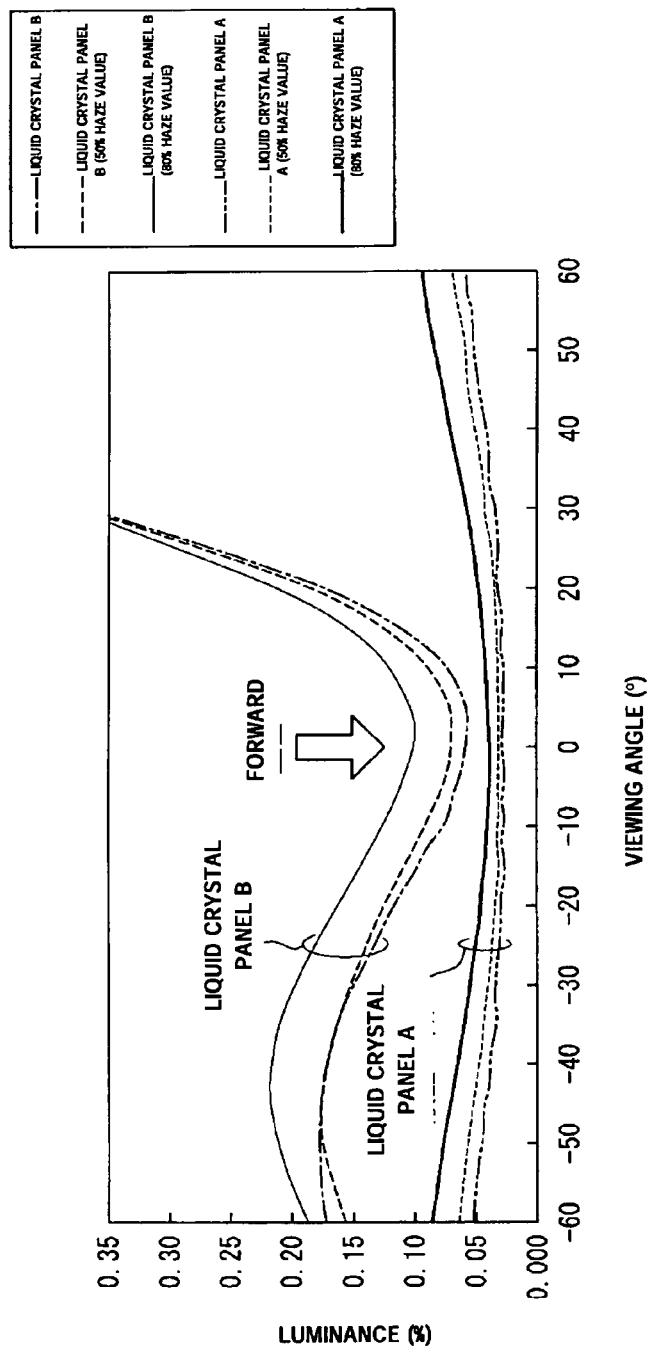
FIG. 8 is a graph showing changes in the viewing-angle characteristics of the liquid crystal panels A and B when provided with light-diffusing layers having different haze values.

Referring to FIGS. 7 and 8, the following is a description of how a high-image-quality and wide-viewing-angle display may be achieved by properly selecting the characteristics of the liquid crystal panel 40 and the light-diffusing layer 38 to satisfy the relationship $\alpha \geq 3\beta$.

FIG. 7 is a graph which describes the viewing-angle characteristics of the liquid crystal panel 40 (liquid crystal panel A), the viewing-angle characteristics of a liquid crystal panel B prepared as a comparative sample, and the diffusion characteristics of the light-diffusing layer 38 (having a haze value of 80%). The liquid crystal panel B is a homogeneous-alignment liquid crystal panel in which liquid crystal molecules in the liquid crystal layer disposed between substrates are arranged in parallel with the substrates. Like the liquid crystal panel 40, the liquid crystal panel B is capable of having the light-diffusing layer 38 disposed adjacent to the front face of the panel B. Here, the viewing-angle characteristics of the liquid crystal panel B were also measured in a state where the light-diffusing layer 38 was not provided.

As shown in FIG. 7, the half-width α for the viewing-angle characteristics of the liquid crystal panel 40 is approximately 70°; the half-width β for the diffusion characteristics of the light-diffusing layer 38 having a haze value of 80% is approximately 10°; and the half-width α for the viewing-angle characteristics of the liquid crystal panel B is approximately 20°. Accordingly, a combination of the liquid crystal panel 40 and the light-diffusing layer 38 having a haze value of 80% satisfies the relationship $\alpha \geq 3\beta$, whereas a combination of the liquid crystal panel B and the light-diffusing layer 38 having a haze value of 80% does not satisfy this relationship.

FIG. 8 is a graph showing measurement results of the black luminance for the liquid crystal panel 40 (liquid crystal panel A) and the liquid crystal panel B, and for each of the panels A and B combined with a forward-scattering film having a haze value of 80% and with a forward-scattering film having a haze value of 50%.

In FIG. 8, the ordinate axis indicates the black luminance (%) of the liquid crystal panels A and B in a transmissive display mode with respect to the atmosphere (i.e., a space where no objects, such as liquid crystal panels and polarizers, are present in the measurement of transmitting light is defined as 100% transmittance), and the abscissa axis indicates the viewing angles (°).

As shown in FIG. 8, although higher haze values of the light-diffusing layer 38 in both liquid crystal panels A and B increase the black luminance overall, the liquid crystal panel A has a lower rate of increase than the liquid crystal panel B.

In other words, as shown in Table 2 below, the contrast value of the liquid crystal panel B decreases largely at a significant rate from the liquid crystal panel B not having the light-diffusing layer 38. Moreover, a combination of the liquid crystal panel B and the light-diffusing layer 38 having an 80% haze value, which does not satisfy the relationship $\alpha \geq 3\beta$, only achieves 50% or less of the contrast obtained by the liquid crystal panel B not having the light-diffusing layer 38. Consequently, this is not preferable since the transmissive display deterioration disadvantage is more pronounced than the benefits of providing the light-diffusing layer 38 (improvement of display quality in the transmissive display mode and cost reduction).

On the other hand, as described previously, the liquid crystal panel A satisfies the relationship $\alpha \geq 3\beta$ even when the panel A is combined with the light-diffusing layer 38 having an 80% haze value. As shown in Table 2, the liquid crystal panel A with the light-diffusing layer 38 having an 80% haze value achieves transmissive display with a high contrast value of at least 200.

TABLE 2

|  | Without light-diffusing layer | With light-diffusing layer (50% haze value) | With light-diffusing layer (80% haze value) |
| --- | --- | --- | --- |
| Contrast of LC panel A | 300 | 266.4 | 205.9 |
| Contrast of LC panel B | 100 | 81.5 | 49.8 |

Furthermore, to verify that satisfaction of the relationship $\alpha \geq 3\beta$, which relates the half-width $\alpha$ for the viewing-angle characteristics of the liquid crystal panel 40 and the half-width $\beta$ for the diffusion characteristics of the light-diffusing layer 38, provides transmissive display with good contrast, liquid crystal panels have been constructed having various half-widths $\alpha$ for the contrast-versus-viewing-angle characteristics of the liquid crystal panels. This was done to examine the contrast change when these liquid crystal panels were combined with two types of light-diffusing layers having different haze values. Table 3 shows measurement results of the contrast in the transmissive display mode for combinations of each of five types of liquid crystal panels having half-widths a from 10° to 80° with a light-diffusing layer having a haze value of 30% ($\beta=8°$). Table 4 shows measurement results of the contrast in the transmissive display mode for combinations of each of four types of liquid crystal panels having half-widths a from 10° to 100° with a light-diffusing layer having a haze value of 90% ($\beta=20°$). Here, the contrast values in Table 3 and Table 4 are normalized such that the contrast of the liquid crystal panel without the light-diffusing layer is 100.

TABLE 3

| $\alpha$ (°) | 10 | 20 | 30 | 40 | 80 |
| --- | --- | --- | --- | --- | --- |
| $\beta$ (30% haze value) | 8 | 8 | 8 | 8 | 8 |
| Contrast | 30 | 45 | 65 | 80 | 93 |

TABLE 4

| $\alpha$ (°) | 10 | 40 | 60 | 100 |
| --- | --- | --- | --- | --- |
| $\beta$ (90% haze value) | 20 | 20 | 20 | 20 |
| Contrast | 20 | 35 | 56 | 78 |

According to Table 3 and Table 4, by selecting the contrast-versus-viewing-angle characteristics of the liquid crystal panel and the diffusion characteristics (haze value) of the light-diffusing layer in a range that satisfies the relationship $\alpha \geq 3\beta$, which is the requirement of the present invention ($\alpha \geq 30°$ in Table 3 and $\alpha \geq 60°$ in Table 4), the decreasing rate of the contrast for transmissive display of the liquid crystal panel provided with the light-diffusing layer can be kept at 50% or below, thus restraining the deterioration of the image quality for transmissive display. Furthermore, providing of the light-diffusing layer improves the visibility for reflective display, and cost reduction of the liquid crystal panel is advantageously achieved.

As shown in FIG. 6, in the liquid crystal display device of this embodiment, the direction (viewing angle) at the maximum contrast of the viewing-angle characteristics of the liquid crystal panel 40 and the direction (viewing angle) at the maximum light emission of the light-diffusing layer 38 are substantially aligned with each other. This effectively restrains contrast deterioration for transmissive display caused by the light-diffusing layer 38 and advantageously utilizes light in the direction of the maximum contrast to achieve a high-image-quality display.

Figure 9:
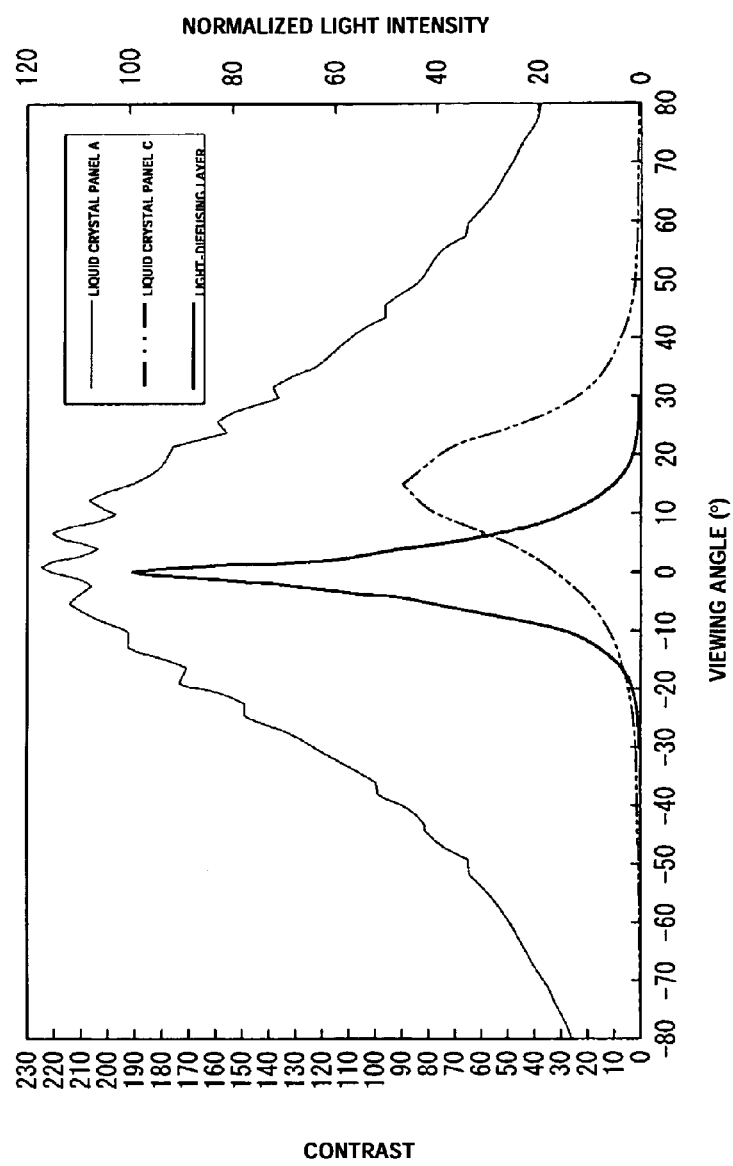
FIG. 9 is a graph showing the contrast-versus-viewing-angle characteristics of the liquid crystal panel A and a liquid crystal panel C and the diffusion characteristics of the light-diffusing layer 38.
Figure 10:
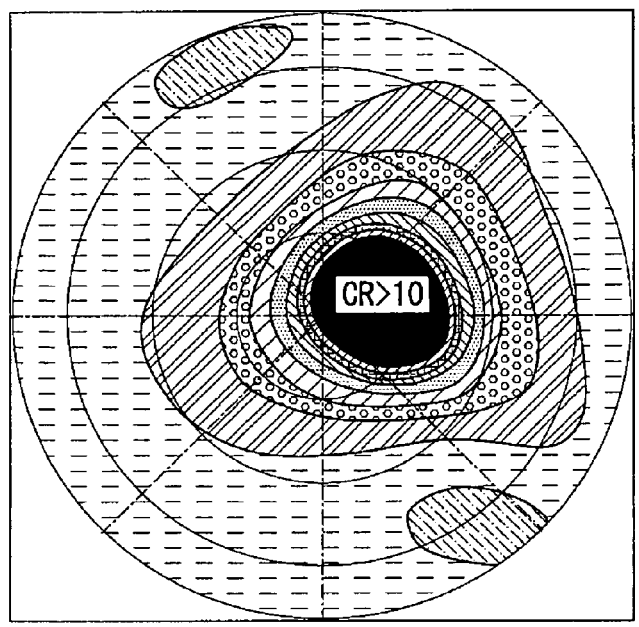
FIG. 10 illustrates contrast curves, in contour, for describing the liquid crystal panel C of FIG. 9.

FIG. 9 is a graph which describes the viewing-angle characteristics of the liquid crystal panel A (liquid crystal panel 40), the diffusion characteristics of the light-diffusing layer 38 (80% haze value), and the viewing-angle characteristics of a liquid crystal panel C prepared as a comparative sample. FIG. 10 illustrates contrast curves, in contour, for describing the liquid crystal panel C of FIG. 9. In FIG. 10, a region indicated by "CR>10" represents a viewing-angle range in which the contrast value is 10 or more, as in FIG. 5. The liquid crystal panel C is a homogeneous-alignment liquid crystal panel in which liquid crystal molecules in the liquid crystal layer disposed between substrates are arranged in parallel with the substrates. Like the liquid crystal panel 40, the liquid crystal panel C is capable of having the light-diffusing layer 38 disposed on the front face of the panel C. Here, the viewing-angle characteristics of the liquid crystal panel C were also measured in a state where the light-diffusing layer 38 was not provided.

As shown in FIG. 9 and FIG. 10, in the liquid crystal panel C, i.e., the comparative sample, the direction at the maximum contrast is positioned at a viewing angle of approximately 15°. If this liquid crystal panel C is combined with the light-diffusing layer 38 having the diffusion characteristics shown in FIG. 9, the originally-low contrast in the forward direction of this liquid crystal panel C is lowered even further. Furthermore, since the display in the direction at the maximum contrast has a low luminance of diffused light, this combination is not preferable since it pronounces the disadvantage that the transmissive display is deteriorated by the light-diffusing layer 38. On the other hand, as shown in FIG. 9, by combining the liquid crystal panel A and the light-diffusing layer 38, in which the direction at the maximum contrast and the direction at the maximum light emission are aligned with each other, the contrast deterioration in the forward direction of the panel A is kept to a minimum.

Furthermore, as shown in FIG. 6 and FIG. 9, in the liquid crystal display device of this embodiment, the direction at the maximum contrast of the liquid crystal panel 40 is preferably set in the direction of the normal line of the panel 40. Thus, when the panel 40 is combined with the light-diffusing layer 38, the contrast deterioration for transmissive display is effectively restrained. Moreover, maximum contrast is obtained in the forward direction of the panel 40, in which a viewer is generally positioned, to provide the viewer with a high-quality display.

Furthermore, it is preferable for the liquid crystal panel 40 provided in the liquid crystal display device of this embodiment to substantially have symmetrical viewing-angle characteristics with respect to the normal-line direction (0° viewing angle) of the panel 40. This prevents contrast deterioration in certain directions even if the display-light is being diffused by the light-diffusing layer 38, thus achieving a high-contrast display.

[Electronic Apparatus]

Figure 12:
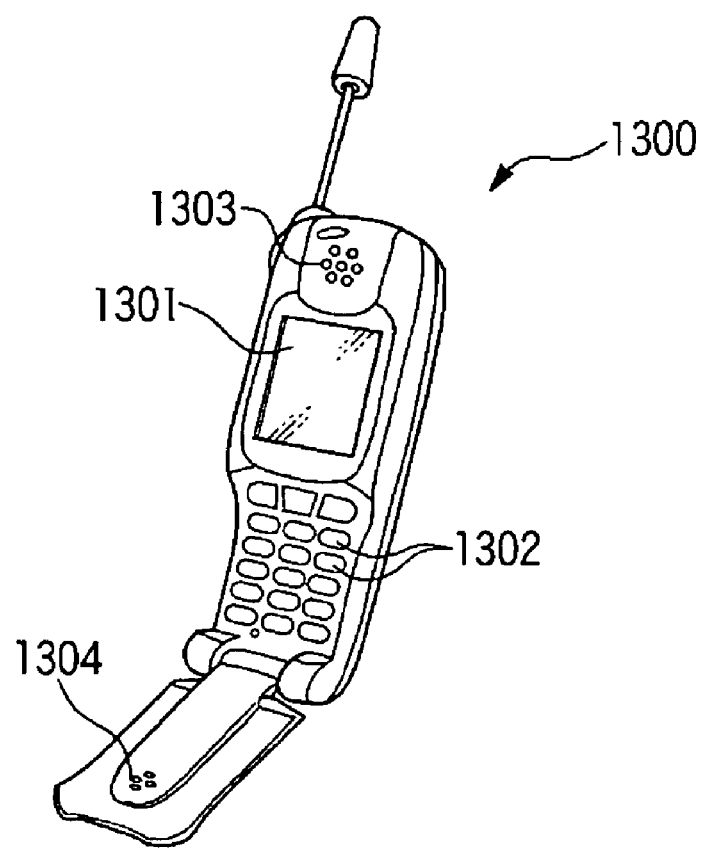
FIG. 12 is a perspective view of an example of an electronic apparatus.

FIG. 12 is a perspective view of an example of an electronic apparatus according to the invention. A cellular phone 1300 shown in FIG. 12 includes a small display region 1301 as the liquid crystal display device of the present invention, a plurality of operating buttons 1302, a receiver 1303, and a mouthpiece 1304.

It should be understood that the display device of the above embodiment is not limited to cellular phones, but is also applicable to image displays such as electronic books, personal computers, digital still cameras, liquid crystal televisions, view-finder or direct-view-monitor video cameras, car navigation systems, pagers, electronic notepads, calculators, word processors, workstations, video telephones, POS terminals, and apparatuses having touch panels. These electronic apparatuses may have a high contrast display with wide viewing angles and include a display region that can be manufactured at low cost.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A liquid crystal display device, comprising:
   an upper substrate and a lower substrate that face each other;
   a liquid crystal layer disposed between the upper substrate and the lower substrate;
   an upper polarizer and a lower polarizer which disposed on both sides of the liquid crystal layer in the state that sandwich the liquid crystal layer; and
   a liquid crystal panel having dot regions that are each provided with a transmissive display area and a reflective display area,
   one of the upper substrate and the lower substrate being provided with a liquid-crystal-layer thickness adjustment layer on a side of the substrate adjacent to the liquid crystal layer, the liquid-crystal-layer thickness adjustment layer providing different thicknesses for the liquid crystal layer in the transmissive display area and the reflective display area, the upper substrate having a light-diffusing layer adjacent to an outer surface of the upper substrate, and
   a half-width $\alpha$ for contrast-versus-viewing-angle characteristics of the liquid crystal panel and a half-width $\beta$ for diffusion characteristics of the light-diffusing layer satisfying a relationship $\alpha \geq 3\beta$.

2. The liquid crystal display device according to claim 1, a haze value of the light-diffusing layer being at least 20%.

3. The liquid crystal display device according to claim 2, the liquid crystal panel having viewing-angle characteristics in which a contrast is at a maximum substantially in a direction of the normal line of the liquid crystal panel.

4. The liquid crystal display device according to claim 1, a viewing-angle direction at a maximum contrast of the liquid crystal panel and a direction at a maximum intensity of light emission of a light-diffusing layer being substantially aligned with each other, the light being incident on the light-diffusing layer from a normal-line direction of the light-diffusing layer.

5. The liquid crystal display device according to claim 1, a viewing-angle characteristics of the liquid crystal panel being substantially symmetrical with respect to a forward direction of the liquid crystal panel.

6. The liquid crystal display device according to claim 1, the liquid crystal layer including liquid crystal having negative dielectric anisotropy.

7. The liquid crystal display device according to claim 6, further comprising electrode layers which are separated by the liquid crystal layer and are provided on two opposite sides of the liquid crystal layer, each of the electrode layers being provided with alignment-regulating device that regulates an alignment of the liquid crystal.

8. The liquid crystal display device according to claim 6, further comprising a circularly-polarized-light entering device that allows circularly-polarized light to enter the upper substrate and the lower substrate.

9. An electronic apparatus, comprising the liquid crystal display device according to claim 1.

* * * * *